(12) United States Patent
Nakamura et al.

(10) Patent No.: US 8,609,578 B2
(45) Date of Patent: Dec. 17, 2013

(54) EXHAUST GAS PURIFYING CATALYST (75) Inventors: Masanori Nakamura, Yokosuka (JP);
Yoshiaki Hiramoto, Yokosuka (JP);
Hiroto Kikuchi, Hiratsuka (JP);
Hironori Wakamatsu, Yokohama (JP);
Kazuyuki Shiratori, Yokohama (JP);
Tetsuro Naito, Yokohama (JP); Katsuo Suga, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 160 days.

(21) Appl. No.: 13/056,438

(22) PCT Filed: Jun. 30, 2009

(86) PCT No.: PCT/JP2009/061995
§ 371 (c)(1),
(2), (4) Date: Jan. 28, 2011

(87) PCT Pub. No.: WO2010/013574
PCT Pub. Date: Feb. 4, 2010

(65) Prior Publication Data
US 2011/0177939 A1 Jul. 21, 2011

(30) Foreign Application Priority Data
Jul. 31, 2008 (JP) ................. 2008-198263

(51) Int. Cl.
*B01J 23/00* (2006.01)
*B01J 21/00* (2006.01)

(52) U.S. Cl.
USPC ........... 502/327; 502/258; 502/259; 502/260; 502/261; 502/262; 502/263; 502/300; 502/328; 502/329; 502/330; 502/331; 502/332; 502/333; 502/334; 502/335; 502/336; 502/337; 502/338; 502/339; 502/349; 502/355; 502/415; 502/439; 502/527.12; 502/527.13

(58) Field of Classification Search
USPC ......... 502/258–263, 300, 327–339, 349, 355, 502/415, 439, 527.12, 527.13
See application file for complete search history.

(56) References Cited

U.S. PATENT DOCUMENTS 5,948,377 A * 9/1999 Sung ........................... 423/213.5
6,025,297 A * 2/2000 Ogura et al. ................... 502/300

(Continued)

FOREIGN PATENT DOCUMENTS

| CN | 101219380 A | 7/2008 |
|----|-------------|--------|
| CN | 101400441 A | 4/2009 |

(Continued)

OTHER PUBLICATIONS

USPTO, Office Action, U.S. Appl. No. 13/254,313, Sep. 27, 2012, 15 pages.

(Continued)

*Primary Examiner* — Cam N. Nguyen
(74) *Attorney, Agent, or Firm* — Foley & Lardner LLP (57) ABSTRACT

An exhaust gas purifying catalyst is constituted by: noble metal particles (1); first compounds (2) which support the noble metal particles (1); second compounds (3) different in type from the first compounds (2); and oxides (4) which surround the noble metal particles (1), the first compounds (2) and the second compounds (3). A median diameter of the first compounds (2) and a median diameter of the second compounds (3) satisfy a relationship of a following inequality:

median diameter of first compounds<median diameter of second compounds.

16 Claims, 6 Drawing Sheets

(56) References Cited

U.S. PATENT DOCUMENTS

| | | | |
|---|---|---|---|
| 6,107,239 A * | 8/2000 | Qin et al. | 502/300 |
| 6,458,741 B1 | 10/2002 | Roark et al. | |
| 6,528,029 B1 * | 3/2003 | Dettling et al. | 423/210 |
| 6,528,451 B2 | 3/2003 | Brezny et al. | |
| 6,808,687 B1 | 10/2004 | Uenishi et al. | |
| 7,022,644 B2 | 4/2006 | Foong et al. | |
| 7,220,702 B2 * | 5/2007 | Hara et al. | 502/327 |
| 7,229,947 B2 * | 6/2007 | Hara et al. | 502/327 |
| 7,297,654 B2 * | 11/2007 | Kimura et al. | 502/326 |
| 7,498,288 B2 * | 3/2009 | Matsueda et al. | 502/325 |
| 7,517,510 B2 * | 4/2009 | Chen et al. | 423/213.2 |
| 7,550,124 B2 * | 6/2009 | Chen et al. | 423/213.2 |
| 7,563,744 B2 * | 7/2009 | Klein et al. | 502/327 |
| 7,585,811 B2 * | 9/2009 | Nakamura et al. | 502/327 |
| 7,601,670 B2 * | 10/2009 | Yasuda et al. | 502/326 |
| 7,605,108 B2 * | 10/2009 | Wakamatsu et al. | 502/326 |
| 7,674,744 B2 * | 3/2010 | Shiratori et al. | 502/327 |
| 7,713,908 B2 * | 5/2010 | Yamamoto et al. | 502/300 |
| 7,713,911 B2 * | 5/2010 | Wakamatsu et al. | 502/332 |
| 7,718,567 B2 * | 5/2010 | Hanaki et al. | 502/304 |
| 7,754,171 B2 * | 7/2010 | Chen et al. | 423/213.2 |
| 7,759,279 B2 | 7/2010 | Shiratori et al. | |
| 7,785,545 B2 | 8/2010 | Miyoshi et al. | |
| 7,799,298 B2 * | 9/2010 | Pfeifer et al. | 423/213.2 |
| 7,851,405 B2 * | 12/2010 | Wakamatsu et al. | 502/332 |
| 8,011,181 B2 | 9/2011 | Hirata | |
| 8,080,494 B2 * | 12/2011 | Yasuda et al. | 502/327 |
| 2004/0009106 A1 * | 1/2004 | Galligan et al. | 422/180 |
| 2005/0163677 A1 * | 7/2005 | Galligan et al. | 422/180 |
| 2005/0215429 A1 * | 9/2005 | Wakamatsu et al. | 502/332 |
| 2006/0019824 A1 | 1/2006 | Miyoshi et al. | |
| 2006/0217263 A1 | 9/2006 | Kawamoto et al. | |
| 2007/0025901 A1 * | 2/2007 | Nakatsuji et al. | 423/239.2 |
| 2007/0104623 A1 | 5/2007 | Dettling et al. | |
| 2007/0110650 A1 * | 5/2007 | Pfeifer et al. | 423/213.5 |
| 2007/0203021 A1 * | 8/2007 | Nakamura et al. | 502/304 |
| 2007/0238605 A1 * | 10/2007 | Strehlau et al. | 502/60 |
| 2008/0044330 A1 * | 2/2008 | Chen et al. | 423/213.5 |
| 2008/0139382 A1 | 6/2008 | Morisaka et al. | |
| 2008/0167181 A1 | 7/2008 | Nakamura et al. | |
| 2008/0233039 A1 * | 9/2008 | Hagemeyer et al. | 423/351 |
| 2009/0069174 A1 * | 3/2009 | Morikawa et al. | 502/261 |
| 2009/0088320 A1 | 4/2009 | Kikuchi et al. | |
| 2009/0111688 A1 | 4/2009 | Nakamura et al. | |
| 2009/0239739 A1 * | 9/2009 | Yasuda et al. | 502/241 |
| 2009/0275467 A1 * | 11/2009 | Shiratori et al. | 502/303 |
| 2009/0280978 A1 * | 11/2009 | Nakamura et al. | 502/303 |
| 2009/0318286 A1 * | 12/2009 | Nagata et al. | 502/339 |
| 2011/0034331 A1 | 2/2011 | Kikuchi et al. | |
| 2012/0053050 A1 | 3/2012 | Shiratori et al. | |
| 2012/0131911 A1 | 5/2012 | Nakagawa et al. | |

FOREIGN PATENT DOCUMENTS

| | | |
|---|---|---|
| DE | 60314 98 4 T2 | 3/2008 |
| EP | 1 657 291 A1 | 5/2006 |
| EP | 1 952 876 A1 | 8/2008 |
| EP | 1 955 765 A1 | 8/2008 |
| EP | 2 022 562 A1 | 2/2009 |
| EP | 2 308 593 A1 | 4/2011 |
| JP | 10-249198 A | 9/1998 |
| JP | 2002-011350 A | 1/2002 |
| JP | 2005-000829 A | 1/2005 |
| JP | 2006-043541 A | 2/2006 |
| JP | 2006-075716 A | 3/2006 |
| JP | 2006-297372 A | 11/2006 |
| JP | 2007-050382 A | 3/2007 |
| JP | 2007-105632 A | 4/2007 |
| JP | 2007-144290 A | 6/2007 |
| JP | 2007-229653 A | 9/2007 |
| JP | 2007-229654 A | 9/2007 |
| JP | 2007-313493 A | 12/2007 |
| JP | 2007-313498 A | 12/2007 |
| JP | 2008-062156 A | 3/2008 |
| JP | 2008-093496 A | 4/2008 |
| JP | 2008-168192 A | 7/2008 |
| JP | 2008-272745 A | 11/2008 |
| RU | 2005538 C1 | 1/1994 |
| RU | 2262983 C2 | 10/2005 |
| RU | 2286209 C2 | 10/2006 |
| RU | 2322296 C1 | 4/2008 |
| WO | WO 2007/052627 A1 | 5/2007 |
| WO | WO-2007/119658 A1 | 10/2007 |
| WO | WO-02/072256 A2 | 9/2012 |

OTHER PUBLICATIONS

USPTO Notice of Allowance, U.S. Appl. No. 13/254,313, Mar. 18, 2013, 10 pages.

Japanese Office Action, Sep. 24, 2013, 4 pages.

Japanese Office Action, Jul. 9, 2013, 5 pages.

* cited by examiner

EXHAUST GAS PURIFYING CATALYST

TECHNICAL FIELD

The present invention relates to an exhaust gas purifying catalyst suitable for application to treatment for purifying exhaust gas discharged from an internal combustion engine.

BACKGROUND ART

In recent years, an exhaust gas purifying catalyst, in which particles of noble metal such as platinum (Pt) and rhodium (Rh) are supported on a support of metal oxide such as alumina ($Al_2O_3$), has been being widely used in order to remove harmful substances such as a hydrocarbon (HC)-based compound, carbon monoxide (CO) and nitrogen oxide ($NO_x$), which are contained in exhaust gas discharged from an internal combustion engine. In the conventional exhaust gas purifying catalyst, a large amount of such noble metal particles is used in order to enhance durability of the noble metal particles against variations of an ambient atmosphere. However, it is not desirable to use the large amount of noble metal particles from a viewpoint of protecting the earth's resources.

One method for reducing such a usage amount of the noble metal while maintaining purification performance for the exhaust gas at a certain level or more is to reduce a particle diameter of the noble metal particles. If the particle diameter of the noble metal particles is reduced, then a specific surface area thereof is increased. Accordingly, it is sufficient that the usage amount of noble metal for obtaining desired purification performance of the catalyst is small. However, when the particle diameter of the noble metal particles is small, the noble metal particles mutually cause thermal aggregation (sintering) owing to a high-temperature use thereof and a long-term use thereof, and accordingly, there is an apprehension that the durability of the noble metal particles may be decreased.

In this connection, an exhaust gas purifying catalyst has been developed, which has a structure in which the noble metal particles are supported on first compounds, and the first compounds supporting the noble metal particles thereon are surrounded by second compounds, whereby the first compounds, on which the noble metal is supported, are separated from one another by the second compounds (Patent Document 1). In the exhaust gas purifying catalyst having such a structure, the noble metal particles are supported on the first compounds, and the noble metal particles are thereby chemically fixed to the first compounds, whereby movement and aggregation of the noble metal particles are suppressed. Moreover, the first compounds, which support the noble metal particles thereon, are physically separated from one another by the second compounds, whereby the first compounds, which support the noble metal thereon, are suppressed from mutual contact and aggregation. In such a way, the noble metal particles are prevented from being aggregated after durability test, whereby the durability thereof can be enhanced.

CITATION LIST

Patent Literature

Patent Document 1: Pamphlet of International Publication WO 2007/052627

SUMMARY OF INVENTION

Technical Problem

The recent demands for the protection of the earth's resources and protection of the earth's environment have been enhanced more and more, and have not been ceased at all. Therefore, the exhaust gas purifying catalyst having excellent characteristics, which is described in the above-mentioned Patent Document 1, is also required to have further enhancement of the characteristics and further decrease of the usage amount of the noble metal.

Here, with regard to the exhaust gas purifying catalyst described in the foregoing Patent Document 1, it has been necessary to reduce an amount of the noble metal particles supported on the first compounds in order to maintain the particle diameter of the noble metal particles to be small. Therefore, this exhaust gas purifying catalyst has reduced a particle diameter of the first compounds. However, when the particle diameter of the first compounds is small, then in some case, a pore volume of the exhaust gas purifying catalyst, which serves as an index of a size of pores thereof, has been reduced, and gas diffusibility thereof has been lowered. Therefore, though the exhaust gas purifying catalyst has had such a structure to maintain the particle diameter of the noble metal particles to be small, enhancement of exhaust gas purification performance, which is brought by reducing the particle diameter of the noble metal particles, has not been sufficient in some case.

Solution to Problem

In order to solve the foregoing problem, an exhaust gas purifying catalyst according to the present invention includes: a noble metal particle; a first compound which supports the noble metal particle; a second compound different in type from the first compound; and an oxide which surrounds the noble metal particle, the first compound and the second compound, wherein a median diameter of the first compound and a median diameter of the second compound satisfy a relationship of a following inequality:

$$\text{median diameter of first compound} < \text{median diameter of second compound}.$$

Advantageous Effects of Invention

In accordance with the exhaust gas purifying catalyst according to the present invention, in the structure in which the noble metal particles can be maintained to be small, the gas diffusibility can be enhanced owing to the presence of the second compounds having a large particle diameter, whereby it becomes possible to enhance such an exhaust gas purification capability.

DESCRIPTION OF EMBODIMENTS

A description is made of an embodiment of an exhaust gas purifying catalyst of the present invention while using the drawings.

Figure 1:
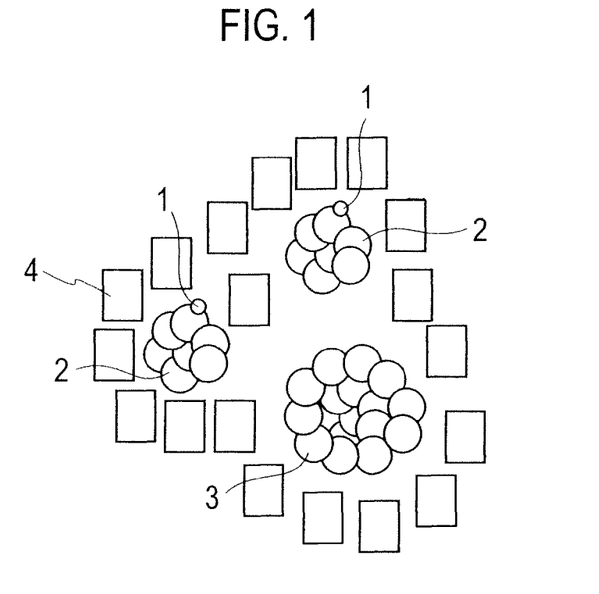
FIG. 1 is a schematic view of an exhaust gas purifying catalyst of an embodiment of the present invention.

FIG. 1 is a schematic view of an exhaust gas purifying catalyst of an embodiment of the present invention. The exhaust gas purifying catalyst shown in FIG. 1 includes: noble metal particles 1 having catalytic activity; first compounds 2 which support the noble metal particles 1; second compounds 3 different in type from the first compounds; oxides 4 which surround the noble metal particles 1, the first compounds 2 and the second compounds 3.

The noble metal particles 1 are supported on the first compounds 2. In such a way, the first compounds chemically bond to the noble metal particles 1, function as an anchor agent, and chemically suppress movement of the noble metal particles 1.

In addition, the oxides 4 are interposed between the second compounds 3 and the first compounds 2 which support the noble metal particles 1, and accordingly, by the oxides 4, a plurality of the first compounds are separated from one another, a plurality of the second compounds are separated from one another, or the first compounds 2 and the second compounds are separated from each other. Therefore, the first compounds 2 which support the noble metal particles 1 are suppressed from mutual contact and aggregation, the plurality of second compounds are suppressed from mutual contact and aggregation, or the first compounds 2 and the second compounds are suppressed from contact and aggregation therebetween. The aggregation of the first compounds 2 which support the noble metal particles 1 is suppressed, whereby aggregation of the noble metal particles 1 supported thereon is also suppressed. The exhaust gas purifying catalyst of this embodiment is provided with such a catalyst structure, whereby the movement of the noble metal particles 1 is suppressed. Accordingly, the mutual aggregation of the noble metal particles 1 is suppressed, and hence, a particle diameter of the noble metal particles 1 can be maintained to be small.

Figure 2:
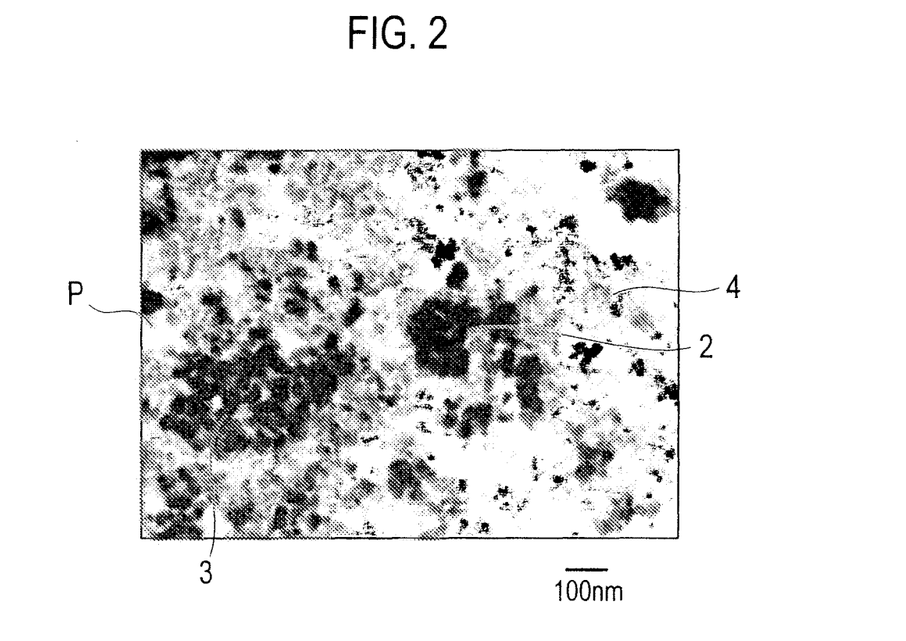
FIG. 2 is a microscope photograph of the exhaust gas purifying catalyst of the present invention.
Figure 3:
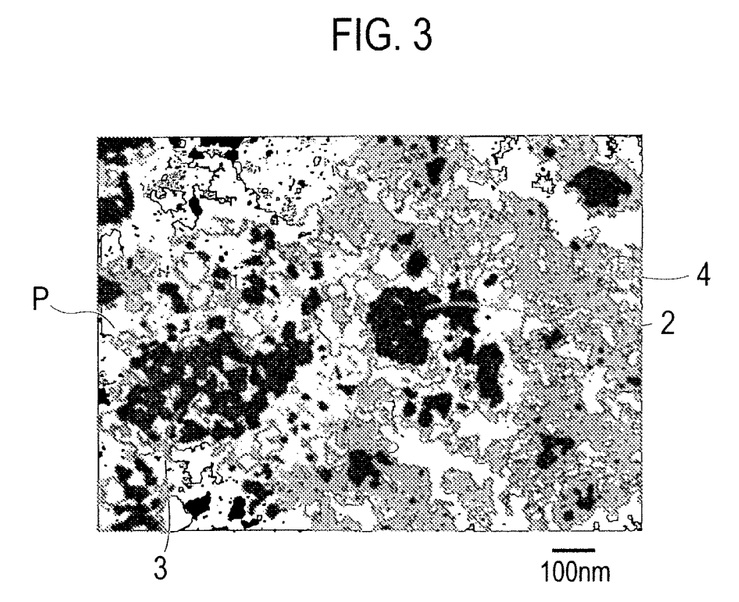
FIG. 3 is a sketch of FIG. 2.

FIG. 2 shows a microscope photograph of the exhaust gas purifying catalyst of the present invention. Moreover, FIG. 3 shows a sketch of FIG. 2. In FIG. 2, portions shown black are the first compounds 2 or the second compounds 3, portions shown white are pores P, and portions shown gray are the oxides 4. As understood from FIG. 2, an exhaust gas purifying catalyst is actually obtained, which includes the first compounds 2, the second compounds 3 and the oxides 4, those being composed in accordance with the present invention, and has the pores P formed therein. Note that the noble metal particles 1 cannot be recognized under a magnification of the microscope photograph shown in FIG. 2 since the particle diameter thereof is significantly smaller as compared with those of the first compounds 2 and the like.

Figure 4:
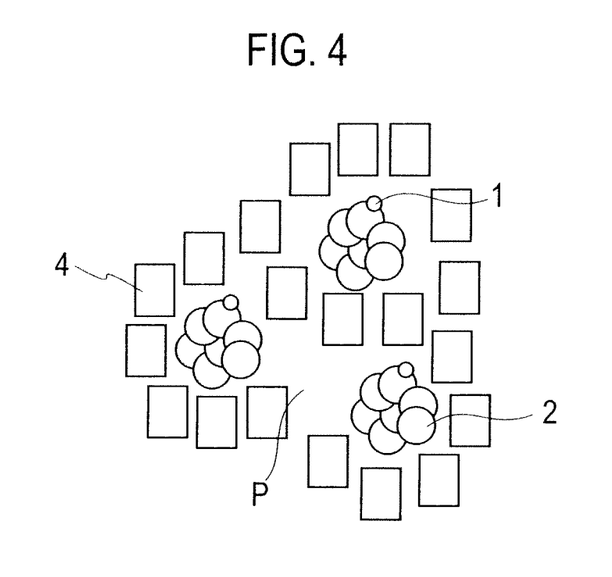
FIG. 4 is a schematic view of a conventional exhaust gas purifying catalyst.

FIG. 4 is a schematic view of a conventional exhaust gas purifying catalyst for comparison. Note that, in FIG. 4, the same reference numerals are assigned to the same constituents as those in FIG. 1. The conventional exhaust gas purifying catalyst shown in FIG. 4 is composed in such a manner that the noble metal particles 1 are supported on the first compounds 2, and that the oxides 4 are formed to cover the first compounds. The conventional exhaust gas purifying catalyst shown in FIG. 4 is different from the exhaust gas purifying catalyst of the present invention, which is shown in FIG. 1, in that the second compounds 3 are not provided. In this case, in the conventional exhaust gas purifying catalyst shown in FIG. 4, the size of the pores P is smaller than in the exhaust gas purifying catalyst of the present invention, which is shown in FIG. 1.

Figure 5:
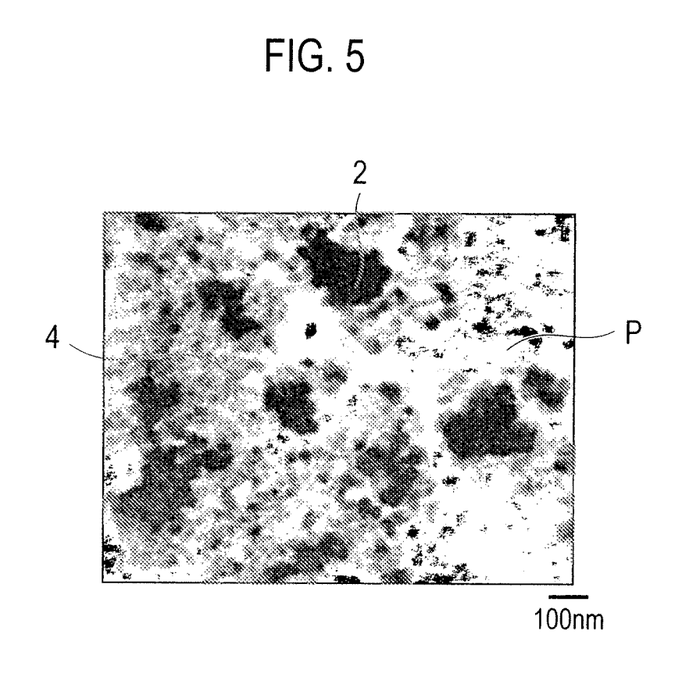
FIG. 5 is a microscope photograph of the conventional exhaust gas purifying catalyst.
Figure 6:
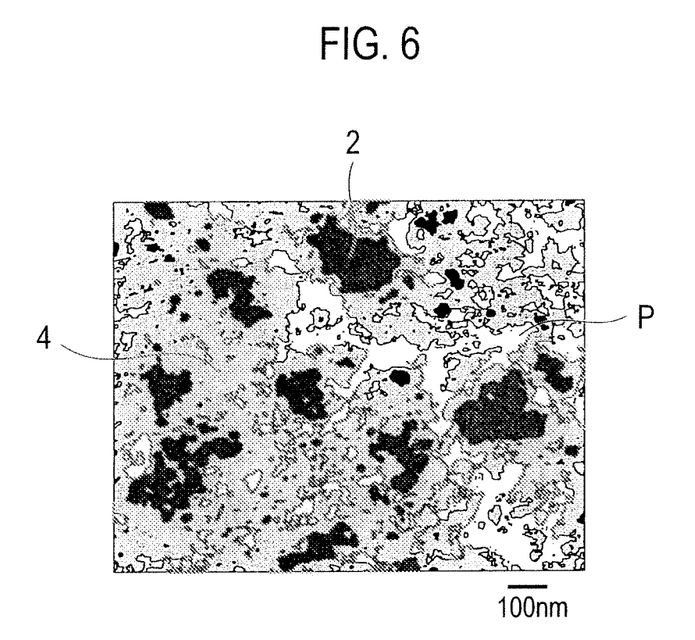
FIG. 6 is a sketch of FIG. 5.

FIG. 5 is a microscope photograph of the conventional exhaust gas purifying catalyst shown in FIG. 4. A magnification of the microscope photograph, which is shown in FIG. 5, is set the same as that of the microscope photograph of the exhaust gas purifying catalyst of the present invention, which is shown in FIG. 2. In FIG. 2, portions shown black are the first compounds 2, portions shown white are the pores P, and portions shown gray are the oxides 4. Moreover, FIG. 6 shows a sketch of FIG. 5. Based on comparison between the microscope photograph of the conventional exhaust gas purifying catalyst, which is shown in FIG. 5, and the microscope photograph of the exhaust gas purifying catalyst of the present invention, which is shown in FIG. 2, it is confirmed that the size of the pores P is small in the conventional exhaust gas purifying catalyst. This is obvious also based on comparison between the sketch shown in FIG. 3 and the sketch shown in FIG. 6.

In comparison with the conventional exhaust gas purifying catalyst shown in FIG. 4, FIG. 5 and FIG. 6, one of features of the exhaust gas purifying catalyst of this embodiment, which is shown in FIG. 1, FIG. 2 and FIG. 3 is that the second compounds having a larger particle diameter than the first compounds are provided. In such a way, in this embodiment, the size of the pores can be increased more than in the conventional exhaust gas purifying catalyst, whereby gas diffusibility can be enhanced, and eventually, catalyst performance can be enhanced.

The above-described effects by the second compounds are more specifically described. The catalyst performance is determined by (1) a surface area of the noble metal particles, (2) contact of gas with the noble metal particles, and (3) an effective usage of the contacting gas. Here, in the conventional exhaust gas purifying catalyst shown in FIG. 4 and FIG. 5, in order to make it possible to maintain a predetermined favorable surface area of the noble metal particles even after use of the catalyst at a high temperature for a long time, there has been adopted a structure as mentioned above, that is, a structure in which the noble metal particles are supported on the first compounds as the anchor agent, and the first compounds supporting the noble metal particles are surrounded (anchor-surrounded) by the oxides. In such a way, the conventional exhaust gas purifying catalyst has succeeded in restricting the particle diameter of the noble metal to approximately 10 [nm] even after durability test, and in increasing the surface area of the noble metal particles.

However, the exhaust gas purifying catalyst with such an anchor-surrounded structure as described above has adopted the structure in which the noble metal-anchor agent as active sites are covered with the oxides as a surrounding material, and accordingly, has had a problem that it becomes difficult for the gas to reach the active sites. Therefore, in order to enhance the gas diffusibility, it is necessary to increase a diameter (volume) of the pores formed by the oxides as the surrounding material.

As a result of an assiduous study of the inventors, it has been found out that there is a correlation relationship between a particle diameter of the first compounds as the anchor agent and the volume of the pores formed by the oxides as the surrounding material. In other words, when the particle diameter of the anchor agent is increased, such a pore volume of the surrounding material that covers the anchor agent is increased. However, when the particle diameter of the anchor agent is simply increased, an amount of the noble metal present on one particle of the anchor agent is increased. In this case, after the durability test, the noble metal particles on a surface of the particle of the anchor agent move and aggregate on the surface, and then become one noble metal particle. Accordingly, as a result, the noble metal particles become a large noble metal particle. This brings about a decrease of the surface area of the noble metal particles.

The present invention strikes a balance between these two contradictory matters, that is, between the reduction of the particle diameter of the noble metal after the durability test and the increase of the pore volume of the surrounding material. It has been found that, as means for the above, it is effective that the anchor agent on which the noble metal particles are supported has a small particle diameter, that other particles having a larger diameter than the anchor agent are provided, and that the other particles are surrounded together with the anchor agent within the oxides. In this connection, one of requirements for the present invention is that a following inequality should be satisfied:

median diameter of first compounds<median diameter of second compounds.

By this requirement, the present invention can strike the balance between the reduction of the particle diameter of the noble metal after the durability test and the increase of the pore volume of the surrounding material. Hence, while favorably maintaining the suppression of the aggregation of the noble metal particles, the gas diffusibility of the exhaust gas purifying catalyst can be enhanced, and eventually, the performance enhancement of the exhaust gas purifying catalyst is achieved.

An important point of the present invention is that the first compounds and the second compounds are simultaneously surrounded within the oxides. In the case where the first compounds and the second compounds are independently surrounded within the oxides, that is, in the case of an exhaust gas purifying catalyst in which the first compounds are surrounded within the oxides, the second compounds are surrounded within the oxides independently thereof, and both of the compounds thus surrounded are mixed with each other, the pore volume in the vicinity where the noble metal particles are actually present cannot be increased though the pore volume is large. Accordingly, performance of the exhaust gas purifying catalyst is not high.

Note that the median diameters of the first compounds and the second compounds were measured by using LA-920 made by HORIBA, Ltd., and the pore volume was measured by a $N_2$ adsorption method by using ASAP2010 made by Shimadzu Corporation. Moreover, the median diameters refer to $D_{50}$.

As the noble metal effective for purifying the exhaust gas, there are mentioned platinum (Pt), palladium (Pd) and rhodium (Rh), and there are preferable combinations of the first compounds, which corresponds to these noble metals. Moreover, as the first compounds, oxides containing Ce and oxides containing Zr or the like can be used, and in this case, composite oxides thereof can also be used. Moreover, preferably, the second compounds are compounds having a promoter function.

In the exhaust gas purifying catalyst of the present invention, preferably, at least one of the first compounds and the second compounds contain plural types of compounds. The reason for this is as follows. Plural types of the anchor agents (first compounds) which support the noble metal particles are provided, and/or plural types of the second compound particles having a larger particle diameter than the first compounds are provided, whereby a mutual interaction in the noble metal particles or an interaction between the noble metal particles and the second compounds as a promoter is enhanced. Thus, in the above described determinant factors of the catalyst performance, (3) the effective usage of the contacting gas is performed.

Preferably, the second compounds are oxides having an oxygen absorption/release function. As an example of the promoter, there is an oxygen release material. Therefore, by the fact that the second compounds are the oxides having the oxygen absorption/release function, the second compounds effectively function as the promoter. Hence, the catalyst performance can be enhanced. As the oxides having this oxygen absorption/release function, for example, there is an oxide containing Cerium (Ce).

More preferably, the median diameter of the first compounds is 300 [nm] or less, and the median diameter of the second compounds is 1000 [nm] or less. When the median diameter of the first compounds exceeds 300 [nm], such a function to keep the noble metal particles small is decreased radically. Moreover, when the median diameter of the second compounds becomes larger than 1000 [nm], it becomes difficult to surround the second compounds by the oxides as the surrounding material simultaneously with the first compounds. Hence, in addition to that the relationship where the median diameter of the second compounds is larger than the median diameter of the first compounds is satisfied, preferably, the respective median diameters of the first compounds and the second compounds satisfy such numeric ranges thereof. Note that a lower limit of the median diameter of the first compounds is not particularly limited, and can be set at that of a median diameter within a range where the first compounds are industrially producible.

More preferably, the median diameter of the first compounds is 200 [nm] or less, and the median diameter of the second compounds is 1000 [nm] or less. By the fact that the median diameter of the first compounds is 200 [nm] or less, an amount of the noble metal supported on one first compound particle can be reduced, and hence, the decrease of the exhaust gas purifying performance, which is caused by the aggregation of the noble metal particles, can be effectively suppressed.

More preferably, the median diameter of the first compounds and the median diameter of the second compounds satisfy a relationship of a following expression:

(median diameter of second compounds)/(median diameter of first compounds)≥1.2.

For example, if the median diameter of the first compounds is 150 [nm], then the median diameter of the second compounds is 180 [nm] or more. A ratio of the median diameter of the second compounds with respect to the median diameter of the first compounds is set at 1.2 or more, whereby the enhancement of the gas diffusibility of the exhaust gas purifying catalyst, which is brought by the fact that the median diameter of the second compounds is larger than the median diameter of the first compounds, can be realized more surely.

More preferably, in the exhaust gas purifying catalyst of the present invention, the pore volume in a range where the pore diameter is 0 to 200 [nm], which is measured by the $N_2$ adsorption method, is 0.3 [cc/g] or more. In the exhaust gas purifying catalyst, a pore diameter effective for the contact between the noble metal particles and the gas is in a range of 200 [nm] or less. The pore diameter in this numeric range represents that of pores in the catalyst powder. As opposed to this, a pore diameter in a range of larger than 200 [nm] represents that of pores in a catalyst coating layer formed on inner walls of a refractory inorganic substrate such as a honeycomb carrier, which partition through holes thereof. Hence, how to increase the pores in the diameter range of 200 [nm] or less, in other words, how to increase the volume of the pores in the diameter range of 200 [nm] or less has a large relationship with a degree of the contact between the gas and the noble metal particles. Then, the volume of the pores in the range where the pore diameter measured by the $N_2$ adsorption method is 0 to 200 [nm] is 0.3 [cc/g] or more, whereby the exhaust gas purification performance can be enhanced. As opposed to this, when the volume of the pores in the range where the pore diameter measured by the $N_2$ adsorption method is 0 to 200 [nm] is reduced more than 0.3 [cc/g] (per gram of the catalyst), then the performance is rapidly decreased. Note that such a pore volume is easily realizable by appropriately containing the second compounds in the exhaust gas purifying catalyst.

Figure 7:
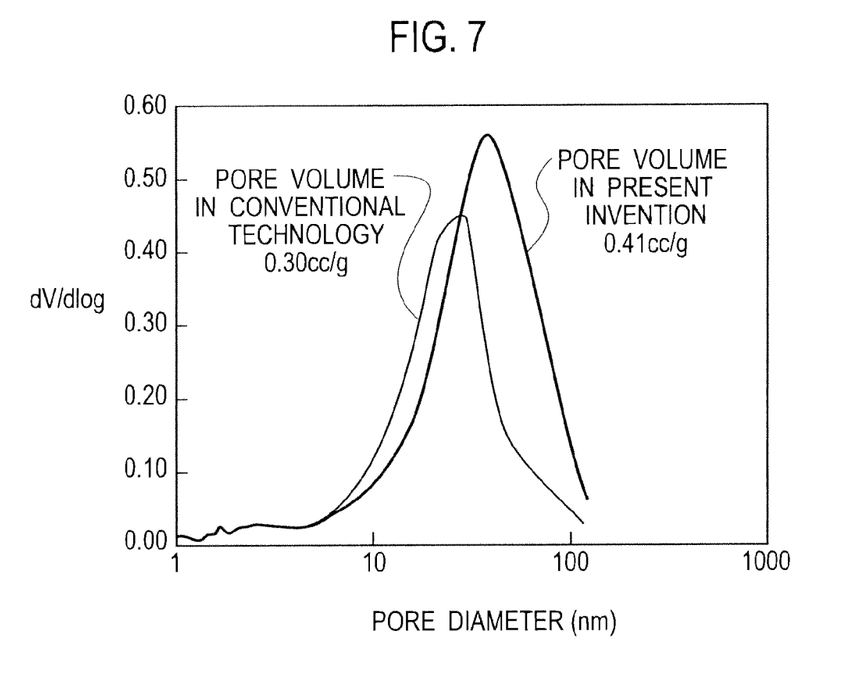
FIG. 7 is a graph showing an example of pore size distributions in the exhaust gas purifying catalyst of the present invention and the conventional exhaust gas purifying catalyst, which are obtained by a $N_2$ adsorption method.

FIG. 7 is a graph showing an example of pore size distributions, which are measured by the $N_2$ adsorption method, with regard to the exhaust gas purifying catalyst of the present invention, which includes the second compounds, and the exhaust gas purifying catalyst of the conventional technology, which does not include the second compounds. It is understood that, in comparison with the exhaust gas purifying catalyst of the conventional technology, the exhaust gas purifying catalyst of the present invention has a peak of the pore size distribution on a side where the pore diameter is larger, and has an increased pore volume.

Figure 8:
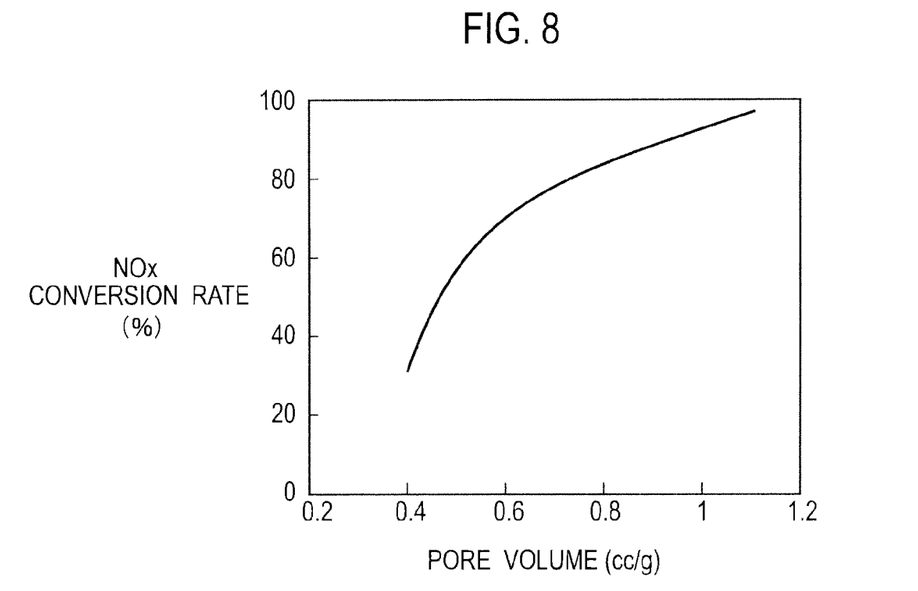
FIG. 8 is a graph showing a relationship between a pore volume of the exhaust gas purifying catalyst in a range where a pore diameter is 0 to 200 [nm] and a NOx conversion rate as an example of exhaust gas purification performance.

FIG. 8 is a graph showing a relationship between the pore volume of the exhaust gas purifying catalyst in the range where the pore diameter is 0 to 200 [nm] and a NOx conversion rate as an example of the exhaust gas purification performance. As understood from FIG. 8, the NOx conversion rate is enhanced as the pore volume of the catalyst is increased.

In the present invention, more preferably, the pore volume in the range where the pore diameter is 0 to 200 [nm], which is measured by the $N_2$ adsorption method, is 0.4 [cc/g] or more. By the fact that the pore volume is 0.4 [cc/g] or more, the exhaust gas purifying performance is further enhanced.

A combination of the noble metal particles and the first compounds in the exhaust gas purifying catalyst of the present invention can be made so that the noble metal can be Pt and that the first compounds can be oxides containing at least Ce. The oxides containing Ce may be not only Ce oxides but also composite oxides of Ce and another transition metal (for example, Zr).

Another combination of the noble metal and the first compounds in the exhaust gas purifying catalyst of the present invention can be made so that the noble metal can be Pd and that the first compounds can be oxides containing at least Zr. The oxides containing Zr may be not only Zr oxides but also composite oxides of Zr and another transition metal (for example, Ce or La).

Still another combination of the noble metal and the first compounds in the exhaust gas purifying catalyst of the present invention can be made so that the noble metal can be Rh and that the first compounds can be oxides containing at least Zr. The oxides containing Zr may be not only Zr oxides but also composite oxides of Zr and another transition metal (for example, La).

Moreover, in the exhaust gas purifying catalyst of the present invention, the second compounds can be oxides containing at least Ce. The reason for this is as follows. The oxides containing Ce are an oxygen absorption/release material, and accordingly, effectively function as the promoter, and can enhance the catalyst performance. The oxides containing Ce may be not only Ce oxides but also composite oxides containing another transition material than Ce, for example, zirconium (Zr), praseodymium (Pr) or yttrium (Y). Unlike the case where the first compounds are the oxides containing Ce, in the case where the second compounds are the oxides containing at least Ce, the noble metal particles are not present on the second compounds. Therefore, in the second compounds, a deterioration at the time of impregnating the noble metal particles does not occur in the production process of the catalyst. Moreover, at the time of using the catalyst, it is estimated that the temperature of the noble metal particles is higher than the exhaust gas temperature under measurement when the noble metal particles are purifying the exhaust gas, and it is conceived that the temperature of the noble metal particles rises extremely; however, the second compounds become less likely to be deteriorated by the high temperature.

Moreover, the second compounds can also be oxides containing at least one element selected from [Fe, Mn, Co and Ni]. The reason for this is as follows. The oxides containing at least one transition element selected from [Fe, Mn, Co and Ni] effectively function as the promoter, whereby the function to effectively use the contacting gas is enhanced, and accordingly, the catalyst performance can be enhanced. The second compounds may be oxides containing one of these transition elements, or may be oxides or composite oxides, which contain two or more thereof.

Furthermore, the second compounds can also be compounds containing at least one selected from [Ba, Mg and Ca]. The reason for this is as follows. The compounds containing at least one alkaline earth element selected from [Ba, Mg and Ca] are a NOx adsorption material, and thereby effectively function as the promoter, whereby the function to effectively use the contacting gas is enhanced, and accordingly, the catalyst performance can be enhanced. Hence, an exhaust gas purifying catalyst in which the second compounds contain at least one selected from [Ba, Mg and Ca] has a high effect particularly as a NOx adsorption catalyst. The reason for this is as follows. A NOx adsorption reaction has extremely high sensitivity to the contact of the gas, and accordingly, the exhaust gas purifying catalyst that enhances the contact of the gas by containing the second compounds in accordance with the present invention can enhance the NOx adsorption reaction.

The exhaust gas purifying catalyst of the present invention is served for an actual machine in such a manner that powder of the exhaust gas purifying catalyst provided with the above-mentioned requirements is coated on the refractory inorganic substrate such as the honeycomb carrier.

Figure 9:
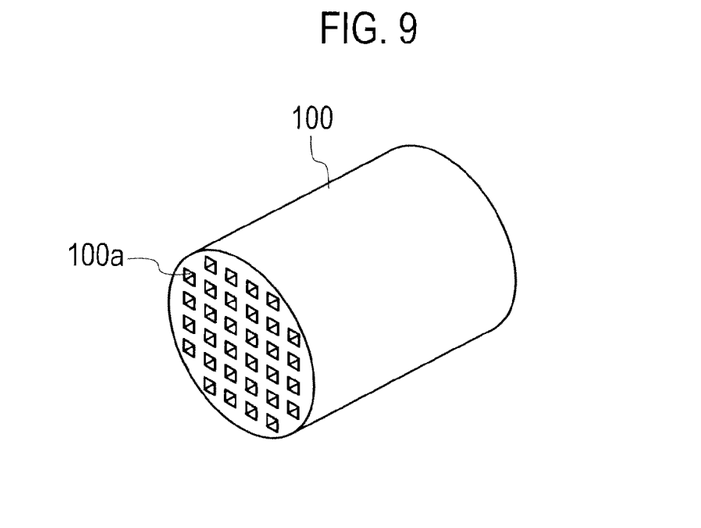
FIG. 9 is a schematic perspective view of an example of a refractory inorganic substrate coated with the exhaust gas purifying catalyst of the present invention.

FIG. 9 is a schematic perspective view of an example of the refractory inorganic substrate coated with the exhaust gas purifying catalyst of the present invention. A refractory inorganic substrate 100 shown in FIG. 9 is composed of a refractory inorganic material, has a substantially columnar shape, and has a large number of through holes 100a formed all the way from one end surface thereof to the other end surface thereof. Note that, in FIG. 9, the through holes 100a are schematically drawn so as to facilitate the understanding of the present invention. Therefore, a shape, dimension and number of the through holes 100a and a thickness of inner walls of the refractory inorganic substrate that partitions the through holes adjacent to one another are different from those of through holes of an actual substrate.

In order to be used for purifying the exhaust gas of an actual automobile, the powder of the exhaust gas purifying catalyst of the present invention is coated on surfaces of inner walls of the through holes of this refractory inorganic substrate. With regard to such coating, for example, catalyst slurry containing the powder of the exhaust gas purifying catalyst is prepared, and this catalyst slurry is adhered onto surfaces of the inner walls of the refractory inorganic substrate, followed by removal of excessive slurry, and subsequent drying and baking, whereby a catalyst coating layer can be obtained. A coating amount of the catalyst just needs to be set at an appropriate amount corresponding to an amount of the noble metal contained in the exhaust gas purifying catalyst. The refractory inorganic substrate on which the catalyst coating layer is formed is connected to an exhaust side of an engine of the automobile, and is served for purifying the exhaust gas. This catalyst coating layer is provided with structural elements of the exhaust gas purifying catalyst of the present invention.

Figure 10:
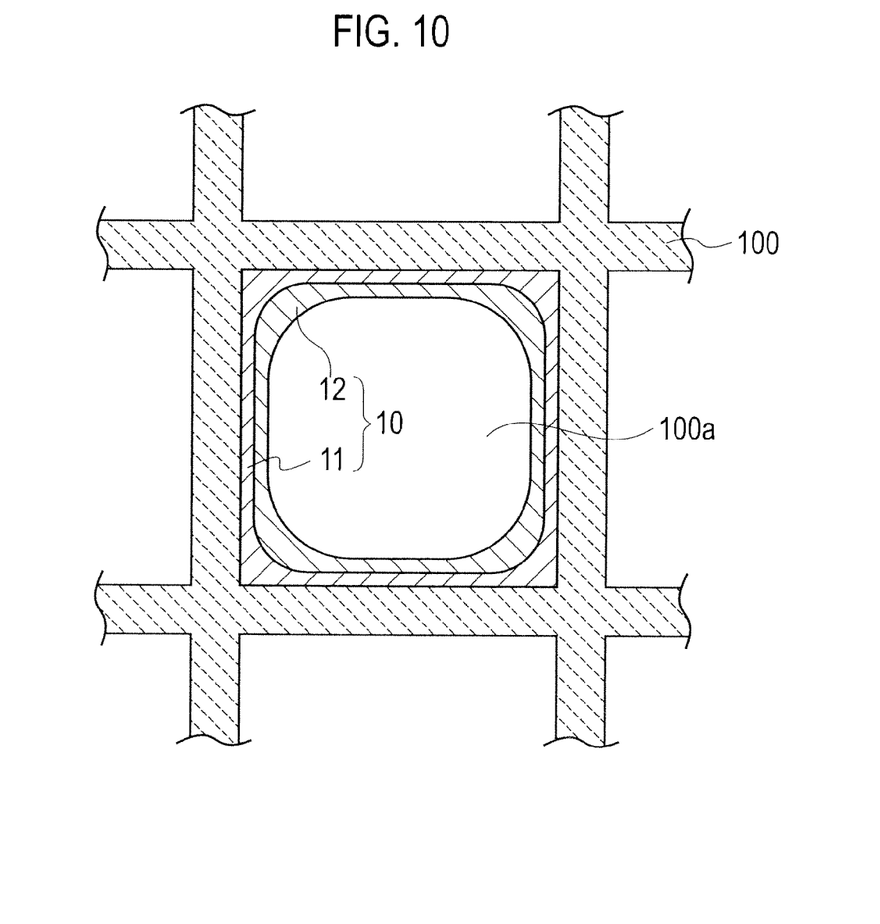
FIG. 10 is an enlarged cross-sectional view of one pore of the refractory inorganic substrate, which is taken along a cross section perpendicular to a penetration direction thereof.

Preferably, the catalyst coating layer formed by coating the above-described powder on the refractory inorganic substrate is composed of a plurality of layers. FIG. 10 shows an enlarged cross-sectional view of one through hole 100a in the refractory inorganic substrate 100 of FIG. 9, which is taken along a cross section perpendicular to a penetrating direction thereof. As shown in the enlarged cross-sectional view of FIG. 10, the catalyst coating layer 10 is formed on such an inner wall surface of the refractory inorganic substrate 100. This catalyst coating layer is composed in such a manner that two catalyst layers, which are first and second catalyst layers 11 and 12 different from each other in type of the exhaust gas purifying catalyst, are stacked on each other.

As shown in FIG. 10, the catalyst coating layer is composed of the plurality of layers different from each other in type of the exhaust gas purifying catalyst, thus making it possible to share functions of the exhaust gas purifying catalyst between the layers. Hence, a plurality of the functions can be optimized by the respective layers, thus making it possible to enhance the performance of the exhaust gas purifying catalyst is a whole of the catalyst coating layer.

Note that, though the example where the catalyst coating layer has two layers in total is shown in FIG. 10, the exhaust gas purifying catalyst of the present invention is not limited to the example where the plurality of layers are two layers, and may have three or more layers.

EXAMPLES

Test 1

In Test 1, the exhaust gas purification performance after the durability test was investigated based on conversion rates.

The following exhaust gas purifying catalysts of Examples 1 to 23 and Comparative examples 1 and 2 were prepared. Each of these exhaust gas purifying catalysts is composed of catalyst layers coated on inner wall surfaces of a cordierite monolithic substrate as the refractory inorganic substrate. (Durability Test Method)

The cordierite monolithic substrate on which the catalyst of each of Examples and Comparative examples was formed was mounted on an exhaust system of a gasoline engine with a displacement of 3500 [cc], a catalyst inlet temperature was set at 800 [° C.], and the gasoline engine was operated for 50 hours.
(Exhaust Gas Purification Test)

The cordierite monolithic substrate that was subjected to the above-described durability test was mounted on the exhaust system of the gasoline engine with a displacement of 3500 [cc], the catalyst inlet temperature was raised from 150° C. to 500° C. at a rate of 10° C./minute, and concentrations of HC, CO and NOx in the exhaust gas individually at a catalyst inlet and a catalyst outlet at that time were measured. Then, rates of HC conversion, CO conversion and NOx conversion were calculated in accordance with the following expressions.

HC conversion rate (%)=[(catalyst inlet HC concentration)−(catalyst outlet HC concentration)]/(catalyst inlet HC concentration)×100

CO conversion rate (%)=[(catalyst inlet CO concentration)−(catalyst outlet CO concentration)]/(catalyst inlet CO concentration)×100

NOx conversion rate (%)=[(catalyst inlet NOx concentration)−(catalyst outlet NOx concentration)]/(catalyst inlet NOx concentration)×100

Moreover, as 50% conversion rate temperatures, temperatures at which the conversion rates by the above-described calculations became 50% were also obtained. It can be said that a catalyst in which this 50% conversion rate temperature is lower is a catalyst having better low-temperature activity.

Example 1

An Rh nitrate solution was impregnated into La-containing $ZrO_2$ powder with a specific surface area of 70 [$m^2/g$], and was supported thereon so that a supporting concentration of Rh could become 1.0 [wt %]. An obtained solution was dried at 150 [° C.] day and night, and was thereafter baked at 400 [° C.] for one hour, whereby Rh (1.0 [wt %])/La-containing $ZrO_2$ powder (hereinafter, referred to as "powder A") was obtained. This powder A was milled to become Rh/La—$ZrO_2$ powder with a median diameter ($D_{50}$) of 148 [nm].

Independently of such preparation of the powder A, Zr-containing $CeO_2$ powder with a specific surface area of 80 [$m^2/g$] was milled, whereby powder (hereinafter, referred to as "powder B") in which a median diameter ($D_{50}$) was set at 231 [nm] was obtained.

Next, boehmite, nitric acid and water were mixed together, and were stirred for 1 [hr]. The above-described powder A and the above-described powder B were slowly poured into this liquid, and an obtained resultant was further stirred for 2 [hr]. Then, the resultant was dried at 80 [° C.] for 3 [hr] under reduced pressure.

After being thus dried, the resultant was baked at 550 [° C.] for 3 [hr] in air, whereby powder C was obtained. In this powder C, a weight ratio of a total amount (powder A powder B) of the powder A and the powder B and $Al_2O_3$ was 70:30. Moreover, a ratio of the powder A and the powder B was 80:20 in terms of the weight ratio.

225 [g] of the above-described powder C, 25 [g] of alumina sol, 230 [g] of water and 20 [g] of acetic acid were individually prepared, and these were poured into a magnetic ball mill, and were mixed and milled, whereby catalyst slurry was obtained.

The obtained catalyst slurry was adhered onto a cordierite monolithic substrate (0.12 [L], 400 cells), excessive slurry in the cells was removed by an air flow, and the catalyst slurry was dried at 130 [° C.], followed by baking at 400 [° C.] for one hour, whereby a catalyst layer with a coating layer of 200 [g/L] was obtained.

Example 2

A production process of the catalyst of Example 2 is the same as that of Example 1 except that, in the above-described production process of the catalyst of Example 1, the supporting concentration of Rh in the powder A was set at 1.4 [wt %], and the ratio of the total amount (powder A+powder B) of the powder A and the powder B and $Al_2O_3$ was set at 50:50.

Comparative Example 1

Comparative example 1 is an example where the second compounds are not provided.

An Rh nitrate solution was supported on La-containing $ZrO_2$ powder with a specific surface area of 70 [$m^2$/g] so that a supporting concentration or Rh could become 0.8 [wt %]. An obtained solution was dried at 150 [° C.] day and night, and was thereafter baked at 400 [° C.] for one hour, whereby Rh (0.8 [wt %])/La-containing $ZrO_2$ powder (hereinafter, referred to as "powder D") was obtained. This powder D was milled to become Rh/La—$ZrO_2$ powder with a median diameter ($D_{50}$) of 148 [nm].

Next, boehmite, nitric acid and water were mixed together, and were stirred for 1 [hr]. The above-described powder D was slowly poured into this liquid, and an obtained resultant was further stirred for 2 [hr]. Then, the resultant was dried at 80 [° C.] for 3 [hr] under reduced pressure.

After being thus dried, the resultant was baked at 550 [° C.] for 3 [hr] in air, whereby powder E was obtained. In this powder E, a ratio of the powder D and $Al_2O_3$ was 70:30 in terms of the weight ratio.

225 [g] of the powder E, 25 [g] of alumina sol, 230 [g] of water and 20 [g] of acetic acid were individually prepared, and these were poured into a magnetic ball mill, and were mixed and milled, whereby catalyst slurry was obtained.

The obtained catalyst slurry was adhered onto a cordierite monolithic substrate (0.12 [L], 400 cells), excessive slurry in the cells was removed by an air flow, and the catalyst slurry was dried at 130 [° C.], followed by baking at 400 [° C.] for one hour, whereby a catalyst layer with a coating layer of 200 [g/L] was obtained.

Comparative Example 2

Comparative example 2 is an example where the first compounds and the second compounds are surrounded by the oxides independently of each other.

An Rh nitrate solution was supported on La-containing $ZrO_2$ powder with a specific surface area of 70 [$m^2$/g] so that a supporting concentration or Rh could become 1.0 [wt %]. An obtained solution was dried at 150 [° C.] day and night, and was thereafter baked at 400 [° C.] for one hour, whereby Rh (1.0 [wt %])/La-containing $ZrO_2$ powder (hereinafter, referred to as "powder F") was obtained. This powder F was milled to become Rh/La—$ZrO_2$ powder with a median diameter ($D_{50}$) of 148 [nm].

Next, boehmite, nitric acid and water were mixed together, and were stirred for 1 [hr]. The above-described powder F was slowly poured into this liquid, and an obtained resultant was further stirred for 2 [hr]. Then, the resultant was dried at 80 [° C.] for 3 [hr] under reduced pressure.

After being thus dried, the resultant was baked at 550 [° C.] for 3 [hr] in air, whereby powder G was obtained. In this powder G, a ratio of the powder F and $Al_2O_3$ was 70:30.

Independently of such preparation of the powder G, Zr-containing $CeO_2$ powder with a specific surface area of 80 [$m^2$/g] was milled, whereby powder (hereinafter, referred to as "powder H") with a median diameter ($D_{50}$) of 231 [nm] was obtained.

(9) Boehmite, nitric acid and water were mixed together, and were stirred for 1 [hr]. The powder H was slowly poured into this liquid, and an obtained resultant was further stirred for 2 [hr]. Then, the resultant was dried at 80 [° C.] for 3 [hr] under reduced pressure.

After being thus dried, the resultant was baked at 550 [° C.] for 3 [hr] in air, whereby powder I was obtained. In this powder I, a ratio of the powder H and $Al_2O_3$ was 70:30.

180 [g] of the above-described powder G, 45 [g] of the above-described powder I, 25 [g] of alumina sol, 230 [g] of water and 20 [g] of acetic acid were individually prepared, and these were poured into a magnetic ball mill, and were mixed and milled, whereby catalyst slurry was obtained.

The obtained catalyst slurry was adhered onto a cordierite monolithic substrate (0.12 [L], 400 cells), excessive slurry in the cells was removed by an air flow, and the catalyst slurry was dried at 130 [° C.], followed by baking at 400 [° C.] for one hour, whereby a catalyst layer with a coating layer of 200 [g/L] was obtained.

Comparative Example 3

Comparative example 3 is an example where the median diameter of the second compounds is smaller than the median diameter of the first compounds.

An Rh nitrate solution was impregnated into La-containing $ZrO_2$ powder with a specific surface area of 70 [$m^2$/g], and was supported thereon so that a supporting concentration of Rh could become 1.0 [wt %]. An obtained solution was dried at 150 [° C.] day and night, and was thereafter baked at 400 [° C.] for one hour, whereby Rh (1.0 [wt %])/La-containing $ZrO_2$ powder (powder A) was obtained. This powder A was milled to become Rh/La—$ZrO_2$ powder with a median diameter ($D_{50}$) of 148 [nm].

Independently of such preparation of the powder A, Zr-containing $CeO_2$ powder with a specific surface area of 80 [$m^2$/g] was milled, whereby powder (hereinafter, referred to as "powder BB") in which a median diameter ($D_{50}$) was set at 117 [nm] was obtained.

Next, boehmite, nitric acid and water were mixed together, and were stirred for 1 [hr]. The above-described powder A and powder BB were slowly poured into this liquid, and an obtained resultant was further stirred for 2 [hr]. Then, the resultant was dried at 80 [° C.] for 3 [hr] under reduced pressure.

After being thus dried, the resultant was baked at 550 [° C.] for 3 [hr] in air, whereby powder CC was obtained. In this powder CC, a ratio of a total amount (powder A+powder BB) of the powder A and the powder BB and $Al_2O_3$ was 70:30 in terms of the weight ratio. Moreover, a ratio of the powder A and the powder BB was 80:20 in terms of the weight ratio.

225 [g] of the above-described powder CC, 25 [g] of alumina sol, 230 [g] of water and 20 [g] of acetic acid were individually prepared, and these were poured into a magnetic ball mill, and were mixed and milled, whereby catalyst slurry was obtained.

The obtained catalyst slurry was adhered onto a cordierite monolithic substrate (0.12 [L], 400 cells), excessive slurry in the cells was removed by an air flow, and the catalyst slurry was dried at 130 [° C.], followed by baking at 400 [° C.] for one hour, whereby a catalyst layer with a coating layer of 200 [g/L] was obtained.

Table 1 shows characteristics and catalyst performances in the catalysts of Example 1, Example 2, Comparative example 1, Comparative example 2 and Comparative example 3, which are mentioned above.

TABLE 1

| | Noble metal | First compound Type | Mean particle diameter (nm) | Second compound Type | Mean particle diameter (nm) | Compounds A + B:Compound C (ratio) | Oxide Type | Powder pore volume (cc/g) | NOx conversion rate after durability test (%) |
|---|---|---|---|---|---|---|---|---|---|
| Example 1 | Rh | Zr—La—$O_x$ | 148 | Ce—Zr—$O_x$ | 231 | 70:30 | $Al_2O_3$ | 0.41 | 96 |
| Example 2 | Rh | Zr—La—$O_x$ | 148 | Ce—Zr—$O_x$ | 231 | 50:50 | $Al_2O_3$ | 0.54 | 98 |
| Comparative Example 1 | Rh | Zr—La—$O_x$ | 148 | None | — | 70:30 | $Al_2O_3$ | 0.30 | 70 |
| Comparative Example 2 | Rh | Zr—La—$O_x$ | 148 | Ce—Zr—$O_x$ | 231 | 70:30 | $Al_2O_3$ | 0.39 | 75 |
| Comparative Example 3 | Rh | Zr—La—$O_x$ | 148 | Ce—Zr—$O_x$ | 117 | 70:30 | $Al_2O_3$ | 0.29 | 71 |

As understood from Table 1, in Example 1 and Example 2, since the second compounds having a larger median diameter than the first compounds are provided, the NOx conversion rates were higher in comparison with Comparative example 1 in which the second compounds are not provided and with Comparative example 2 where the first compounds and the second compounds are supported within the oxides independently of each other. In Comparative example 2, though the second compounds are provided, the second compounds are supported within the oxides independently of the first compounds, and accordingly, the NOx conversion rate was inferior to that in Example 1 and Example 2 though the pore volume became higher than that of Comparative example 1. This is conceived to stand for the fact that, in Comparative example 2, the pore volume in the vicinities of the first compounds cannot be obtained sufficiently, and the gas diffusibility on the peripheries of the noble metal particles is poor. The reason why Comparative example 2 has higher performance than Comparative example 1 is conceived to be that the second compounds function as the promoter.

Moreover, in Comparative example 3, though the first compounds have the same median diameter as that in Example 1, the second compounds have a smaller median diameter than the median diameter of the first compounds. Accordingly, Comparative example 3 is poor in the effect of expanding the pore volume of the catalyst powder, which is brought by the presence of the second compounds, and hence, the powder pore volume and NOx conversion rate thereof were substantially the same as those in Comparative example 1. By comparison between Comparative example 3 and Example 1, obviously, by the fact that the second compounds having a larger median diameter than the first compounds are provided in accordance with the present invention, the pore volume of the catalyst powder is expanded, and eventually, the NOx conversion rate is enhanced.

Example 3

Example 3 is an example where plural types of the first compounds are provided.

Dinitrodiamine Pt salt was supported on Zr-containing $CeO_2$ powder with a specific surface area of 80 [m²/g] so that a supporting concentration of Pt could become 1.0 [wt %]. An obtained solution was dried at 150 [° C.] day and night, and was thereafter baked at 400 [° C.] for one hour, whereby Pt (1.0 [wt %])/Zr-containing $CeO_2$ powder (hereinafter, referred to as "powder J") was obtained. This powder 0.1 was milled to become Pt/Zr—$CeO_2$ powder with a median diameter ($D_{50}$) of 131 [nm].

Next, boehmite, nitric acid and water were mixed together, and were stirred for 1 [hr]. The powder A, the powder B and the powder J were slowly poured into this liquid, and an obtained resultant was further stirred for 2 [hr]. Then, the resultant was dried at 80 [° C.] for 3 [hr] under reduced pressure.

After being thus dried, the resultant was baked at 550 [° C.] for 3 [hr] in air, whereby powder K was obtained. In this powder K, a ratio of a total amount (powder A+powder B+powder J) of the powder A, the powder B and the powder J and $Al_2O_3$ was 70:30 in terms of the weight ratio. Moreover, a ratio of the powder A, the powder B and the powder J was 40:20:40.

225 [g] of the above-described powder K, 25 [g] of alumina sol, 230 [g] of water and 20 [g] of acetic acid were individually prepared, and these were poured into a magnetic ball mill, and were mixed and milled, whereby catalyst slurry was obtained.

The obtained catalyst slurry was adhered onto a cordierite monolithic substrate (0.12 [L], 400 cells), excessive slurry in the cells was removed by an air flow, and the catalyst slurry was dried at 130 [° C.], followed by baking at 400 [° C.] for one hour, whereby a catalyst layer with a coating layer of 200 [g/L] was obtained.

Example 4

Example 3 is an example where plural types of the first compounds are provided, and plural types of the second compounds are provided.

Pr-containing $CeO_2$ with a specific surface area of 80 [m²/g] was milled and turned into powder with a median diameter ($D_{50}$) of 228 [nm] (powder L).

Next, boehmite, nitric acid and water were mixed together, and were stirred for 1 [hr]. The powder A, the powder B, the powder J and the powder L were slowly poured into this liquid, and an obtained resultant was further stirred for [hr]. Then, the resultant was dried at 80 [° C.] for 3 [hr] under reduced pressure.

After being thus dried, the resultant was baked at 550 [° C.] for 3 [hr] in air, whereby powder M was obtained.

225 [g] of the above-described powder M, 25 [g] of alumina sol, 230 [g] of water and 20 [g] of acetic acid were individually prepared, and these were poured into a magnetic ball mill, and were mixed and milled, whereby catalyst slurry was obtained.

The obtained catalyst slurry was adhered onto a cordierite monolithic substrate (0.12 [L], 400 cells), excessive slurry in the cells was removed by an air flow, and the catalyst slurry was dried at 130 [° C.], followed by baking at 400 [° C.] for one hour, whereby a catalyst layer with a coating layer of 200 [g/L] was obtained.

Example 5

Example 5 is an example where plural types of the first compounds are provided. Moreover, as the second compounds, not the Zr-containing $CeO_2$ powder (powder B) in Example 3 but Ce and Y-containing $ZrO_2$ powder (hereinafter, referred to as "powder N") was used.

Pd nitrate salt was supported on Ce and La-containing $ZrO_2$ powder with a specific surface area of 70 [$m^2$/g] so that a supporting concentration of Pd could become 1.0 [wt %]. An obtained solution was dried at 150 [° C.] day and night, and was thereafter baked at 400 [° C.] for one hour, whereby Pd (1.0 [wt %])/Ce, La-containing $ZrO_2$ powder (hereinafter, referred to as "powder O") was obtained. This powder O was milled to become Pd/Ce, La—$ZrO_2$ powder with a median diameter ($D_{50}$) of 131 [nm].

Next, boehmite, nitric acid and water were mixed together, and were stirred for 1 [hr]. The powder J, the powder O and the powder N were slowly poured into this liquid, and an obtained resultant was further stirred for 2 [hr]. Then, the resultant was dried at 80 [° C.] for 3 [hr] under reduced pressure.

After being thus dried, the resultant was baked at 550 [° C.] for 3 [hr] in air, whereby powder P was obtained. In this powder P, a weight ratio of a total amount (powder J+powder O+powder N) of the powder J, the powder O and the powder N and $Al_2O_3$ was 70:30. Moreover, a ratio of the powder J, the powder N and the powder O was 40:20:40 in terms of the weight ratio.

225 [g] of the above-described powder P, 25 [g] of alumina sol, 230 [g] of water and 20 [g] of acetic acid were individually prepared, and these were poured into a magnetic ball mill, and were mixed and milled, whereby catalyst slurry was obtained.

The obtained catalyst slurry was adhered onto a cordierite monolithic substrate (0.12 [L], 400 cells), excessive slurry in the cells was removed by an air flow, and the catalyst slurry was dried at 130 [° C.], followed by baking at 400 [° C.] for one hour, whereby a catalyst layer with a coating layer of 200 [g/L] was obtained.

Example 6

Example 6 is an example where plural types of the first compounds are provided.

Boehmite, nitric acid and water were mixed together, and were stirred for 1 [hr]. The powder A, the powder O and the powder B were slowly poured into this liquid, and an obtained resultant was further stirred for 2 [hr]. Then, the resultant was dried at 80 [° C.] for 3 [hr] under reduced pressure.

After being thus dried, the resultant was baked at 550 [° C.] for 3 [hr] in air, whereby powder Q was obtained. In this powder Q, a ratio of a total amount (powder A+powder O+powder B) of the powder A, the powder O and the powder B and $Al_2O_3$ was 70:30. Moreover, a ratio of the powder A, the powder B and the powder O was 40:20:40.

225 [g] of the powder Q, 25 [g] of alumina sol, 230 [g] of water and 20 [g] of acetic acid were individually prepared, and these were poured into a magnetic ball mill, and were mixed and milled, whereby catalyst slurry was obtained.

The obtained catalyst slurry was adhered onto a cordierite monolithic substrate (0.12 [L], 400 cells), excessive slurry in the cells was removed by an air flow, and the catalyst slurry was dried at 130 [° C.], followed by baking at 400 [° C.] for one hour, whereby a catalyst layer with a coating layer of 200 [g/L] was obtained.

Table 2 shows characteristics and catalyst performances in the catalysts of Examples 3 to 6, which are mentioned above. Note that, in each of Examples 3 to 6, the weight ratio of the total amount of the first compounds and the second compounds and the oxides ($Al_2O_3$) was 70:30. However, the catalyst of the present invention is not limited to those with such a weight ratio.

TABLE 2

| | Noble metal (No. 1) | First compound (No. 1) Type | Mean particle diameter (nm) | Noble metal (No. 2) | First compound (No. 2) Type | Mean particle diameter (nm) | Second compound (No. 1) Type | Mean particle diameter (nm) |
|---|---|---|---|---|---|---|---|---|
| Example 3 | Rh | Zr—La—$O_x$ | 148 | Pt | Ce—Zr—$O_x$ | 131 | Ce—Zr—$O_x$ | 231 |
| Example 4 | Rh | Zr—La—$O_x$ | 148 | Pt | Ce—Zr—$O_x$ | 131 | Ce—Zr—$O_x$ | 231 |
| Example 5 | Pt | Ce—Zr—$O_x$ | 131 | Pd | Zr—Ce—La—$O_x$ | 151 | Zr—Ce—Y—$O_x$ | 217 |
| Example 6 | Rh | Zr—La—$O_x$ | 148 | Pd | Zr—Ce—La—$O_x$ | 151 | Ce—Zr—$O_x$ | 231 |

| | Second compound (No. 2) Type | Mean particle diameter (nm) | Oxide Type | Powder pore volume (cc/g) | NOx conversion rate after durability test (%) |
|---|---|---|---|---|---|
| Example 3 | None | — | $Al_2O_3$ | 0.42 | 98 |
| Example 4 | Ce—Pr—$O_x$ | 228 | $Al_2O_3$ | 0.41 | 98 |
| Example 5 | None | — | $Al_2O_3$ | 0.42 | 88 |
| Example 6 | None | — | $Al_2O_3$ | 0.43 | 94 |

As understood from Table 2, the plural types of the first compounds and/or the second compounds were provided, whereby the performance was able to be enhanced more.

Examples 7 to 19

Examples 7 to 19 are examples where the median diameter of the first compounds, the median diameter of the second compounds and the pore volume of the catalyst powder were set at a variety of values. These median diameters were adjusted by milling the first compounds and the second compounds. Note that types of the noble metal particles, the first compounds and the second compounds in the catalysts of Examples 7 to 19 are the same as those in Example 1.

Table 3 shows the types of the noble metal, the types and median diameters of the first compounds, the types and median diameters of the second compounds, the pore volumes of the catalyst powder and purification performances in catalysts of Examples 7 to 19 together with such values of Example 1 for comparison.

Examples 20 to 23

Examples 20 to 23 are examples where the second compounds are the oxides containing at least one element selected from [Fe, Mn, Co and Ni]. Note that Examples 20 to 23 are the

TABLE 3

| | | First compound | | Second compound | | Ratio as: (mean particle diameter of second compound)/ (mean particle diameter of first compound) | | Powder pore volume (cc/g) | NOx conversion rate after durability test (%) |
|---|---|---|---|---|---|---|---|---|---|
| | Noble metal | Type | Mean particle diameter (nm) | Type | Mean particle diameter (nm) | | Oxide Type | | |
| Example 1 | Rh | Zr—La—$O_x$ | 148 | Ce—Zr—$O_x$ | 231 | 1.56 | $Al_2O_3$ | 0.41 | 96 |
| Example 7 | Rh | Zr—La—$O_x$ | 148 | Ce—Zr—$O_x$ | 182 | 1.23 | $Al_2O_3$ | 0.37 | 87 |
| Example 8 | Rh | Zr—La—$O_x$ | 148 | Ce—Zr—$O_x$ | 172 | 1.16 | $Al_2O_3$ | 0.33 | 85 |
| Example 9 | Rh | Zr—La—$O_x$ | 148 | Ce—Zr—$O_x$ | 307 | 2.07 | $Al_2O_3$ | 0.43 | 97 |
| Example 10 | Rh | Zr—La—$O_x$ | 148 | Ce—Zr—$O_x$ | 504 | 3.41 | $Al_2O_3$ | 0.45 | 98 |
| Example 11 | Rh | Zr—La—$O_x$ | 148 | Ce—Zr—$O_x$ | 711 | 4.80 | $Al_2O_3$ | 0.45 | 98 |
| Example 12 | Rh | Zr—La—$O_x$ | 148 | Ce—Zr—$O_x$ | 948 | 6.41 | $Al_2O_3$ | 0.45 | 98 |
| Example 13 | Rh | Zr—La—$O_x$ | 148 | Ce—Zr—$O_x$ | 1054 | 7.12 | $Al_2O_3$ | 0.45 | 92 |
| Example 14 | Rh | Zr—La—$O_x$ | 97 | Ce—Zr—$O_x$ | 182 | 1.88 | $Al_2O_3$ | 0.31 | 85 |
| Example 15 | Rh | Zr—La—$O_x$ | 97 | Ce—Zr—$O_x$ | 172 | 1.77 | $Al_2O_3$ | 0.29 | 82 |
| Example 16 | Rh | Zr—La—$O_x$ | 221 | Ce—Zr—$O_x$ | 307 | 1.39 | $Al_2O_3$ | 0.44 | 94 |
| Example 17 | Rh | Zr—La—$O_x$ | 278 | Ce—Zr—$O_x$ | 504 | 1.81 | $Al_2O_3$ | 0.45 | 94 |
| Example 18 | Rh | Zr—La—$O_x$ | 304 | Ce—Zr—$O_x$ | 504 | 1.66 | $Al_2O_3$ | 0.45 | 92 |
| Example 19 | Rh | Zr—La—$O_x$ | 351 | Ce—Zr—$O_x$ | 504 | 1.44 | $Al_2O_3$ | 0.46 | 88 |

As obvious from Table 3, the catalyst performance after the durability test was enhanced by the fact that the median diameter of the first compounds was 300 [nm] or less, and that the median diameter of the second compounds was 1000 [nm] or less. Moreover, the catalyst performance after the durability test was further enhanced by the fact that the median diameter of the first compounds was 200 [nm] or less, and that the median diameter of the second compounds was 1000 [nm] or less.

Moreover, excellent catalyst performance was obtained after the durability test by the fact that the median diameter of the first compounds and the median diameter of the second compounds satisfied the relationship of the following inequality:

(median diameter of second compounds)/(median diameter of first compounds)≥1.2.

Furthermore, the catalyst performance after the durability test was enhanced by the fact that the pore volume in the range where the pore diameter was 0 to 200 [nm] in the catalyst was 0.3 [cc/g] or more. Still further, the catalyst performance after the durability test was further enhanced by the fact that the pore volume was 0.4 [cc/g] or more.

same as Example 1 except the types of the second compounds and the median diameters adjusted by milling the second compounds.

Table 4 shows types of the noble metal, types and median diameters of the first compounds, the types and median diameters of the second compounds, pore volumes of the catalyst powder and catalyst performances in catalysts of Examples 20 to 23 together with such values of Example 1 for comparison.

TABLE 4

| | Noble metal | First compound | | Second compound | | Oxide Type | Powder pore volume (cc/g) | NOx conversion rate after durability test (%) |
|---|---|---|---|---|---|---|---|---|
| | | Type | Mean particle diameter (nm) | Type | Mean particle diameter (nm) | | | |
| Example 1 | Rh | Zr—La—$O_x$ | 148 | Ce—Zr—$O_x$ | 231 | $Al_2O_3$ | 0.41 | 96 |
| Example 20 | Rh | Zr—La—$O_x$ | 148 | $Fe_2O_3$ | 228 | $Al_2O_3$ | 0.41 | 96 |
| Example 21 | Rh | Zr—La—$O_x$ | 148 | $Mn_2O_3$ | 240 | $Al_2O_3$ | 0.42 | 97 |
| Example 22 | Rh | Zr—La—$O_x$ | 148 | $Co_3O_4$ | 232 | $Al_2O_3$ | 0.42 | 97 |
| Example 23 | Rh | Zr—La—$O_x$ | 148 | NiO | 215 | $Al_2O_3$ | 0.41 | 97 |

As obvious from Table 4, even in the case where the second compounds are the oxides containing at least one element selected from [Fe, Mn, Co and Ni], the exhaust gas purifying catalyst of the present invention exhibited excellent purification performance after the durability test.

Test 2

In Test 1, the exhaust gas purification performance after the durability test was investigated based on the conversion rates when the air-fuel ratio was changed from the lean side to the rich side.

Exhaust gas purifying catalysts of Examples 24 to 29 were prepared as below. These exhaust gas purifying catalysts are composed of catalyst layers coated on the inner wall surfaces of the cordierite monolithic substrates as the refractory inorganic substrates.

(Durability Test Method)

The cordierite monolithic substrate on which the catalyst of each of Examples and Comparative examples was formed was mounted on an exhaust system of a gasoline engine with a displacement of 3500 [cc], a catalyst inlet temperature was set at 700 [° C.] and the gasoline engine was operated for 50 hours.

(Exhaust Gas Purification Test)

A test temperature was set at 300 [° C.] to 350 [° C.]. Each of the catalysts was mounted on an exhaust system of a gasoline engine with a displacement of 2000 [cc], the gasoline engine was operated under air-fuel conditions from a lean side (A/F=25) for 40 [sec] to a rich side (A/F=11) for 2 [sec], and an exhaust purification rate in a section therebetween was determined.

Examples 24 to 27

Examples 24 to 27 are examples where the second compounds are the oxides containing Ce or the oxides containing at least one element selected from [Ba, Mg and Ca]. Note that, in Examples 24 to 27, the powder J was used in place of the powder A in Example 1. Moreover, as the second compounds, there were used the oxides containing Ce or the oxides containing at least one element selected from [Ba, Mg and Ca], and the median diameters thereof were adjusted by milling the oxides. Besides the above, the same conditions as those in Example 1 were used.

Table 5 shows types of the noble metal, types and median diameters of the first compounds, the types and median diameters of the second compounds, pore volumes of the catalyst powder and NOx conversion rates after the durability test in catalysts of Examples 24 to 27.

130 [° C.], followed by baking at 400 [° C.] for one hour, whereby a catalyst layer with a coating layer of 200 [g/L] was obtained.

Next, the catalyst slurry of Example 1 was adhered onto the above-described catalyst layer, excessive slurry in the cells was removed by an air flow, and the catalyst slurry was dried at 130 [° C.], followed by baking at 400 [° C.] for one hour, whereby a catalyst layer with a coating layer of 100 [g/L] was obtained.

Example 29

Example 29 is an example where the catalyst coating layer formed by coating the powder of the exhaust gas purifying catalyst on the refractory inorganic substrate is composed of a plurality of layers in a similar way to Example 28. Note that Example 29 is different from Example 28 in type of the coating layers.

First, catalyst slurry was obtained, in which the powder A of Example 1 was replaced by the powder O. The obtained catalyst slurry was adhered onto a cordierite monolithic substrate (0.12 [L], 400 cells), excessive slurry in the cells was removed by an air flow, and the catalyst slurry was dried at 130 [° C.], followed by baking at 400 [° C.] for one hour, whereby a catalyst layer with a coating layer of 200 [g/L] was obtained.

Next, the slurry of Example 1 was adhered onto the above-described catalyst layer, excessive slurry in the cells was removed by an air flow, and the slurry was dried at 130 [° C.], followed by baking at 400 [° C.] for one hour, whereby a catalyst layer with a coating layer of 100 [g/L] was obtained.

Table 6 shows types of the respective coating layers and purification performances of the catalysts in Example 28 and Example 29.

TABLE 5

| | Noble metal | First compound | | Second compound | | | Powder pore volume (cc/g) | NOx conversion rate after durability test (%) |
|---|---|---|---|---|---|---|---|---|
| | | Type | Mean particle diameter (nm) | Type | Mean particle diameter (nm) | Oxide Type | | |
| Example 24 | Pt | Ce—Zr—$O_x$ | 131 | Ce—Zr—$O_x$ | 231 | $Al_2O_3$ | 0.41 | 23 |
| Example 25 | Pt | Ce—Zr—$O_x$ | 131 | $BaCO_3$ | 206 | $Al_2O_3$ | 0.40 | 78 |
| Example 26 | Pt | Ce—Zr—$O_x$ | 131 | $MgCO_3$ | 211 | $Al_2O_3$ | 0.39 | 54 |
| Example 27 | Pt | Ce—Zr—$O_x$ | 131 | $CaCO_3$ | 214 | $Al_2O_3$ | 0.39 | 71 |

As obvious from Table 5, in comparison with the case where the second compounds are the oxides containing Ce, in the case where the second compounds are the oxides containing at least one element selected from [Fe, Mn, Co and Ni], the exhaust gas purifying catalyst of the present invention had excellent characteristics as a NOx adsorption catalyst.

Example 28

Example 28 is an example where the catalyst coating layer formed by coating the powder of the exhaust gas purifying catalyst on the refractory inorganic substrate is composed of a plurality of layers.

First, catalyst slurry was obtained, in which the powder A of Example 1 was replaced by the powder J. The obtained catalyst slurry was adhered onto a cordierite monolithic substrate (0.12 [L], 400 cells), excessive slurry in the cells was removed by an air flow, and the catalyst slurry was dried at

TABLE 6

| | First catalyst layer (inner layer) | Second catalyst layer (surface layer) | NOx conversion rate (%) |
|---|---|---|---|
| Example 28 | Pt powder of Example 3 | Rh powder of Example 1 | 99 |
| Example 29 | Pd powder of Example 5 | Rh powder of Example 1 | 98 |

As obvious from Table 6, in comparison with Example 1 where the catalyst coating layer is a single layer, each of Example 28 and Example 29 had an enhanced NOx conversion rate and excellent exhaust gas purification performance after the durability test since the plurality of catalyst layers were provided.

The entire contents of Japanese Patent Application No. 2008-198263 (filed on: Jul. 31, 2008) are incorporated herein by reference.

The description has been made above of the embodiment to which the invention made by the inventors is applied. However, the present invention is not limited to the description and the drawings, which are in accordance with this embodiment and form a part of the disclosure of the present invention. It is additionally mentioned that, specifically, other embodiments, examples, operation technologies and the like, which are made by those skilled in the art based on the above-described embodiment, are entirely incorporated in the scope of the present invention.

INDUSTRIAL APPLICABILITY

The exhaust gas purifying catalyst of the present invention is superior to the conventional ones in exhaust gas purification performance, and accordingly, while maintaining the purification performance for the exhaust gas at a certain level or more, can reduce the usage amount of the noble metal, and can be suitably used for the exhaust gas system of the automobile.

The invention claimed is:

1. An exhaust gas purifying catalyst comprising:
   a noble metal particle;
   a first compound which supports the noble metal particle;
   a second compound different from the first compound; and
   an oxide which surrounds the noble metal particle, the first compound and the second compound,
   wherein a median diameter of the first compound and a median diameter of the second compound satisfy a relationship of a following inequality:

median diameter of first compound<median diameter of second compound.

2. The exhaust gas purifying catalyst according to claim 1, wherein at least one of the first compound and the second compound contains plural compounds.

3. The exhaust gas purifying catalyst according to claim 1, wherein the second compound is an oxide having an oxygen absorption/release function.

4. The exhaust gas purifying catalyst according to claim 1, wherein the median diameter of the first compound is 300 nm or less, and the median diameter of the second compound is 1000 nm or less.

5. The exhaust gas purifying catalyst according to claim 1, wherein the median diameter of the first compound is 200 nm or less, and the median diameter of the second compound is 1000 nm or less.

6. The exhaust gas purifying catalyst according to claim 1, wherein the median diameter of the first compound and the median diameter of the second compound satisfy a relationship of a following expression:

(median diameter of second compound)/(median diameter of first compound)≥1.2.

7. The exhaust gas purifying catalyst according to claim 1, wherein, in the exhaust gas purifying catalyst, a pore volume in a range where a pore diameter is 0 to 200 nm is 0.3 cc/g or more, and the pore diameter is measured by a $N_2$ adsorption method.

8. The exhaust gas purifying catalyst according to claim 1, wherein, in the exhaust gas purifying catalyst, a pore volume in a range where a pore diameter is 0 to 200 nm is 0.4 cc/g or more, and the pore diameter is measured by a $N_2$ adsorption method.

9. The exhaust gas purifying catalyst according to claim 1, wherein the noble metal particle is Pt, and the first compound is an oxide containing at least Ce.

10. The exhaust gas purifying catalyst according to claim 1, wherein the noble metal particle is Pd, and the first compound is an oxide containing at least Zr.

11. The exhaust gas purifying catalyst according to claim 1, wherein the noble metal particle is Rh, and the first compound is an oxide containing at least Zr.

12. The exhaust gas purifying catalyst according to claim 1, wherein the second compound is an oxide containing at least Ce.

13. The exhaust gas purifying catalyst according to claim 1, wherein the second compound is an oxide containing at least one element selected from Fe, Mn, Co and Ni.

14. The exhaust gas purifying catalyst according to claim 1, wherein the second compound is a compound containing at least one element selected from Ba, Mg and Ca.

15. A substrate, comprising:
    a refractory inorganic supported exhaust gas purifying catalyst;
    and a catalyst coating layer formed by coating a powder of the exhaust gas purifying catalyst of claim 1 on the refractory inorganic substrate.

16. The supported exhaust gas purifying catalyst according to claim 15, wherein the catalyst coating layer is composed of a plurality of layers.

* * * * *